Oct. 11, 1927.

R. ROSSMANN 1,645,257

METHOD OF AND APPARATUS FOR PASSING THREADS INTO FABRICS

Filed May 24, 1926     2 Sheets-Sheet 1

Inventor,
Rudolf Rossmann

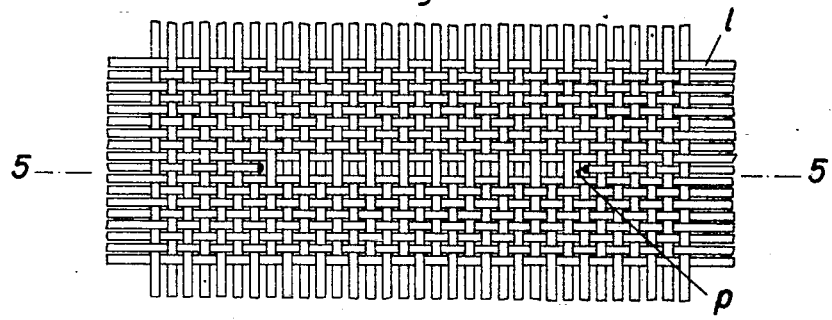
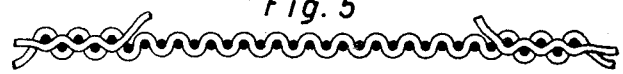
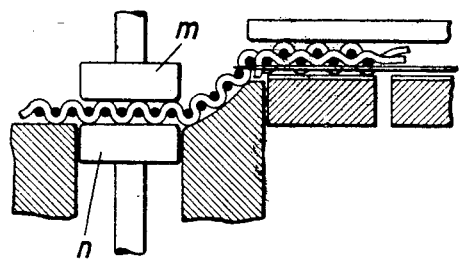
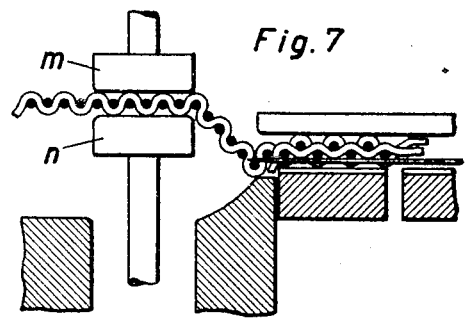
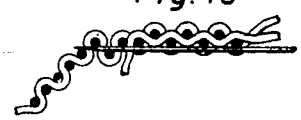
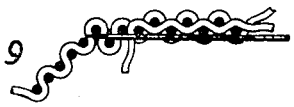
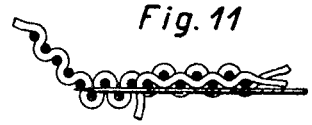
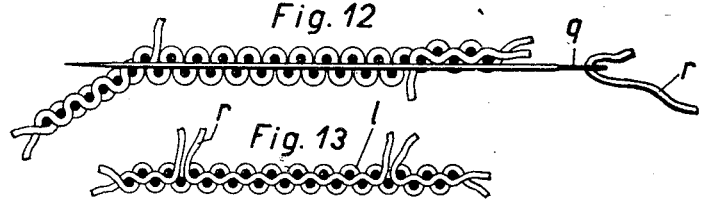
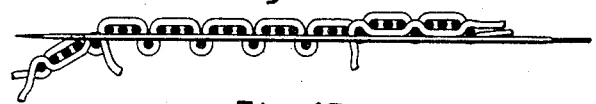
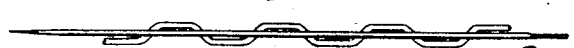

Patented Oct. 11, 1927.

1,645,257

UNITED STATES PATENT OFFICE.

RUDOLF ROSSMANN, OF GRUNBERG, GERMANY, ASSIGNOR TO DEUTSCHE WOLLEN-WAREN MANUFAKTUR AKTIENGESELLSCHAFT, OF GRUNBERG, GERMANY, A CORPORATION OF GERMANY.

METHOD OF AND APPARATUS FOR PASSING THREADS INTO FABRICS.

Application filed May 24, 1926, Serial No. 111,300, and in Germany May 30, 1925.

My invention relates to improvements in the method of and apparatus for passing threads into fabrics for mending defective parts thereof, or producing a pattern thereon. More particularly my invention relates to mechanical darning means for passing darning threads through a fabric. The object of the improvements is to provide an apparatus which is simple in construction and reliable in operation and with this object in view my invention consists in providing a relatively fixed needle and means for feeding the fabric thereto while reciprocating the same transversely of the needle.

For the purpose of explaining the invention an apparatus suitable for putting the method into effect has been illustrated in the accompanying drawings, in which the same letters of reference have been used in all the views to indicate corresponding parts.

In said drawings

Fig. 4 shows a part of a fabric having a defective portion,

Fig. 5 is a sectional view taken on the line 5—5 of Fig. 4,

Figure 1:
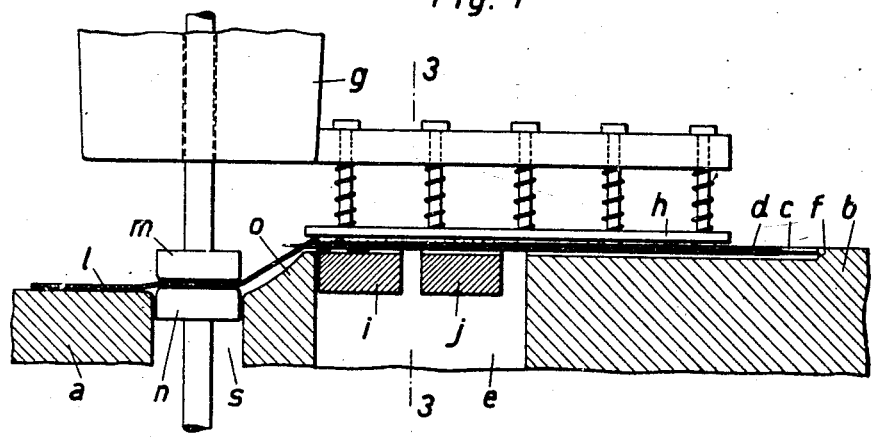
Fig. 1 is an elevation partly in section showing the main parts of the machine.

Fig. 6 is a sectional elevation of a part of the apparatus shown in Fig. 1 and having a fabric placed thereon, Fig. 7 is a similar sectional elevation showing the parts in different positions, Figs. 8 to 12 are sectional detail views showing the needle and a part of the fabric in different steps of the operation, Fig. 13 is a sectional view showing the mended fabric, Fig. 14 is a sectional view illustrating a modification of the improved method, and Fig. 15 is a diagrammatical elevation showing another modification.

In describing the invention I shall make reference only to the main parts of the machine. The driving mechanism for the said parts has not been illustrated because my invention does not specifically relate thereto, and an expert will readily be able to provide suitable driving mechanism for the operative parts.

Figure 2:
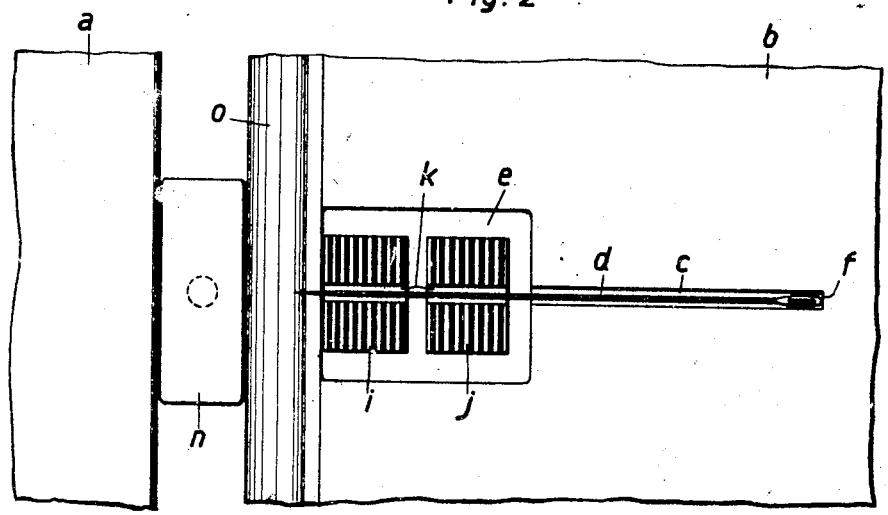
Fig. 2 is a top plan view of Fig. 1, with the presser mechanism removed.
Figure 3:
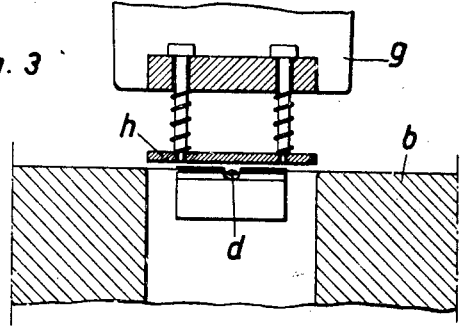
Fig. 3 is a sectional elevation taken on the line 3—3 of Fig. 1.

In the example shown in Figs. 1 to 3 my improved apparatus comprises a table having a lower or front part $a$ and an elevated rear part $b$, the said parts being connected by an inclined part $o$. The rear part $b$ is formed with a recess $e$ having a pair of feed dogs $i$ and $j$ disposed therein, which feed dogs are connected with suitable mechanism adapted to impart thereto oscillating movement for intermittently advancing the fabric from the left to the right. Above the rear part $b$ of the table there is a presser mechanism which, as shown, comprises one or more spring pressed plates $h$ mounted on an arm $g$ of the machine and adapted to co-operate with the feed dogs $i$ and $j$ in the manner known in the art. The part $b$ of the table is formed with a longitudinal groove $c$ adapted to have a needle $d$ placed therein, which needle is provided at its rear end with an eye $q$ for receiving a thread $r$. The feed dogs are likewise formed with a groove $k$ having the needle $d$ embedded therein. The needle is supported with its rear end on the rear wall $f$ of the groove $c$ which acts as an abutment.

The front part $a$ of the table is formed with a recess $s$ in which a plunger $n$ has reciprocating movement, which plunger cooperates with a plunger $m$ located above the same and guided in the arm $g$, the object of the said plungers being to impart reciprocating upward and downward movement to the fabric $l$ held between the same. The front end of the presser plate or plates $h$ extends forwardly beyond the feed dog $i$ and to the corner formed by the parts $b$ and $o$ of the table, the said corner and the front edge of the plate $h$ providing a pair of jaws for holding the fabric $l$ when moving the same upwardly or downwardly by means of the plungers $n$ and $m$ and stitching the needle therethrough.

The operation of the machine is as follows:

It may be assumed that a linen fabric shown in Fig. 4 is to be mended in which one of the weft threads $p$ is torn. The fabric is placed on the portion $a$ of the table and between the plungers m and n thereof, and it is passed over the needle and between the presser plate h and the feed dogs i and j so that the rear end of the defective portion e is located in front of the point of the needle. Now the machine is set into operation. The feed dogs i, j engage the part of the fabric located at the sides of the needle and pull the same rearwardly a distance corresponding to the distance between successive weft threads. Thus the point of the needle stitches through the fabric from the bottom side thereof, as is indicated in Fig. 6. Thereafter the plungers m, n elevate the fabric into the position shown in Fig. 7, the fabric being swung around the point of the needle. At the end of the upward movement of the fabric the feed dogs advance the same another step thus stitching the needle through the fabric from the top face thereof, as is shown in Fig. 8. Thereafter the fabric is again moved downwardly and around the point of the needle, as is shown in Fig. 9, whereupon it is advanced towards the needle which therefore stitches through the fabric from the bottom side thereof, as is shown in Fig. 10. The same operations are repeated, another intermediate step being illustrated in Fig. 11, until finally the defective part of the fabric is threaded on the needle in the form of a plait, whereupon the needle is pulled forwardly for drawing in the thread. Fig. 13 shows the mended fabric and the thread r.

For inserting a thread into a fabric having an irregular tie, in which for example the thread passes above one thread and thereafter below three threads, as is shown in Fig. 14, the feed dogs must be operated with varying feed. In some cases the feed dogs i and j are operated with different feeds, one of the said dogs advancing the fabric a distance corresponding to two threads, and the other advancing the same a distance corresponding to three threads. For regularly passing the thread over two or more transverse threads, for example alternately over and below two threads, as is shown in Fig. 15, the feed dogs have a regular feed corresponding to the distance between the threads. If the fault of the fabric is so long that a needle is not sufficient for mending the same in one operation, the needle is passed several times through the fabric.

In the example shown in Figs. 1 to 3, the presser mechanism is located above the feed dogs. But I wish it to be understood that I do not limit myself to this feature. I may use any known or preferred feeding mechanism, for example a combined presser and feeding mechanism such as are known in sewing machines. Further, I do not limit myself to a construction in which the parts a and b of the table are disposed in different planes. When disposing the said parts in the same plane I provide the table between the plungers m, n and the feed dogs with a recess.

It will be understood that my improved method may be generally used for stitching threads into fabrics of various kinds either for improving the quality of the fabric, or for producing a particular effect, or for making embroidery work thereon. For example by means of my improved apparatus the threads may be stitched in a fabric diagonally of the warp and weft threads.

I claim:

1. The method of stitching thread into fabrics, which comprises feeding the fabric intermittently onto a stationary threaded needle and alternately shifting the fabric to opposite sides of the needle during intervals between feeding movements, said feeding and shifting movements being related in accordance with the thread grouping of the fabric, whereby the inserted thread is incorporated in the weave of the fabric.

2. The herein described method of stitching threads in fabrics, which consists in intermittently advancing the fabric towards a stationary threaded needle, and reciprocating the fabric transversely of the needle and making a sharp bend across the fabric at the needle point while the advancing movement is interrupted and in accordance with the pattern of the fabric.

3. A machine of the class described, comprising a table, an abutment thereon, a needle held stationary by said abutment, means for intermittently feeding a fabric longitudinally of the needle, and separate means for reciprocating the fabric transversely of the needle.

4. A machine of the class described, comprising a table adapted to have a stationary needle thereon, means for intermittently feeding a fabric longitudinally of the needle, and means for reciprocating the fabric transversely of the needle, while the feeding movement is interrupted.

5. A machine of the class described, comprising a table having a groove therein, a needle in the groove, means for intermittently feeding a fabric longitudinally of the needle, and a pair of reciprocating plungers located in advance of the needle and adapted to reciprocate the fabric transversely of the needle.

6. A machine of the class described, comprising a table having a recess and a groove crossing the said recess and a needle held therein, a feed dog arranged to intermittently feed the fabric mounted within said recess and formed with a groove in alignment with said groove of the table, yielding presser mechanism co-operating with said dog, a pair of reciprocating grippers located in advance of said needle and to grip the fabric, and reciprocate it transversely of the needle, the operations of said feed dog and grippers being timed to alternately perform the feeding and reciprocating movements.

7. A machine of the class described, comprising a table formed with a transverse corner and a recess at the rear of said corner, a needle crossing said recess and having its point above said corner, a feed dog within said recess, a yielding presser plate having its front part located above said corner, and means located in front of said corner for reciprocating the fabric transversely of the needle.

In testimony whereof I hereunto affix my signature.

RUDOLF ROSSMANN.